United States Patent
Xiao et al.

(10) Patent No.: US 8,812,302 B2
(45) Date of Patent: Aug. 19, 2014

(54) TECHNIQUES FOR INSERTING DIACRITICAL MARKS TO TEXT INPUT VIA A USER DEVICE

(75) Inventors: Xiangye Xiao, Beijing (CN); Yuanbo Zhang, Beijing (CN); Vincent Ngo Bao Khoi, Shanghai (CN); Fan Yang, Beijing (CN); Baohua Liao, Beijing (CN); Hanping Feng, Beijing (CN)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/565,056

(22) Filed: Aug. 2, 2012

(65) Prior Publication Data

US 2013/0185054 A1  Jul. 18, 2013

(51) Int. Cl.
*G06F 17/27*  (2006.01)

(52) U.S. Cl.
USPC .............................................. 704/9

(58) Field of Classification Search
CPC ....................................... G06F 17/27
USPC .............................................. 704/9
See application file for complete search history.

(56) References Cited

U.S. PATENT DOCUMENTS

| | | | | |
|---|---|---|---|---|
| 6,167,369 A * | 12/2000 | Schulze | ............................. | 704/9 |
| 6,393,389 B1 * | 5/2002 | Chanod et al. | ..................... | 704/7 |
| 6,562,078 B1 * | 5/2003 | Yang et al. | ..................... | 715/202 |
| 6,631,501 B1 | 10/2003 | Jurion et al. | | |
| 7,721,203 B2 | 5/2010 | Jurion et al. | | |
| 7,925,498 B1 * | 4/2011 | Baker et al. | ....................... | 704/9 |
| 7,966,173 B2 * | 6/2011 | Emam et al. | ...................... | 704/9 |
| 8,041,559 B2 * | 10/2011 | El-Shishiny | ....................... | 704/9 |
| 8,069,045 B2 * | 11/2011 | Emam et al. | .................. | 704/256 |
| 2005/0060448 A1 * | 3/2005 | Gutowitz | ......................... | 710/72 |
| 2006/0149549 A1 * | 7/2006 | Napper | .......................... | 704/257 |
| 2007/0067720 A1 | 3/2007 | Tran | | |
| 2007/0255550 A1 * | 11/2007 | Menezes et al. | .................. | 704/2 |
| 2008/0189606 A1 | 8/2008 | Rybak | | |
| 2008/0262828 A1 * | 10/2008 | Och et al. | ........................... | 704/3 |
| 2008/0300861 A1 * | 12/2008 | Emam et al. | ...................... | 704/8 |
| 2010/0125451 A1 * | 5/2010 | Napper et al. | ..................... | 704/9 |
| 2010/0332215 A1 | 12/2010 | Alhonen | | |
| 2011/0137635 A1 * | 6/2011 | Chalabi et al. | .................... | 704/2 |
| 2012/0036468 A1 * | 2/2012 | Colley | ........................... | 715/773 |
| 2012/0109633 A1 * | 5/2012 | Khorsheed et al. | ................ | 704/8 |

* cited by examiner

*Primary Examiner* — Michael N Opsasnick
(74) *Attorney, Agent, or Firm* — Remarck Law Group PLC (57) ABSTRACT

A computer-implemented method for assisting a user to input Vietnamese text to a user device lacking a subset of characters in a Vietnamese alphabet includes receiving a character input by a user, determining three words previously input by the user, the three words having already had diacritical marks inserted, transmitting the three words and the character to a server via a network, receiving first and second information corresponding to the character from the server via the network, the first and second information generated at the server based on a context of the three words, the context determined at the server using a language model, the first and second information indicating whether the character requires a diacritical mark and a specific diacritical mark, respectively, generating a modified character comprising a character in the Vietnamese alphabet based on the character and the first and second information, and displaying the modified character.

20 Claims, 8 Drawing Sheets

TECHNIQUES FOR INSERTING DIACRITICAL MARKS TO TEXT INPUT VIA A USER DEVICE

FIELD

The present disclosure relates to user devices and, more particularly, to techniques for inserting diacritical marks to text input via a user device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "user device" generally refers to a computing device having user interface, a display, and a processor. For example, the user device may be a desktop computer. User devices also may include mobile user devices such as mobile phones, tablet computers, and the like. User devices may selectively connect to a network such as the Internet and/or a mobile telephone network. A user may input information, e.g., text, to the user device via a user interface (or "character layout") such as a keyboard. Due to size constraints, however, many user devices, e.g., mobile user devices, may include a partial QWERTY-based physical keyboard. Additionally or alternatively, user devices may include touch displays, e.g., capacitive sensing displays, which both display information to the user and receive input from the user. For example, these user devices may display a character layout to the user similar to the partial QWERTY-based keyboard.

SUMMARY

A computer-implemented technique is presented for assisting a user to input Vietnamese text via a user interface of a user device lacking a subset of characters in a Vietnamese alphabet. The technique includes receiving, at the user device including the user interface, a display, and a processor, a character input by a user. The technique includes determining, at the user device, three words previously input by the user, the three words having already had diacritical marks inserted. The technique includes transmitting, from the user device, the three words and the character to a server via a network. The technique includes receiving, at the user device, at least one of first and second information corresponding to the character from the server via the network, the first and second information generated at the server based on a context of the three words, the context determined at the server using a language model, the first information indicating whether the character requires a diacritical mark, and the second information indicating a specific diacritical mark. The technique includes generating, at the user device, a modified character based on the character and the first and second information, the modified character comprising a character in the Vietnamese alphabet. The technique includes displaying, via the display of the user device, the modified character.

Another computer-implemented technique is also presented. The technique includes receiving, at a user device including a user interface, a display, and a processor, a first character input by a user. The technique includes determining, at the user device, one or more second characters previously input by the user to the user device. The technique includes determining, at the user device, a context of the one or more second characters using a language model. The technique includes determining, at the user device, first information corresponding to the first character based on the context of the one or more second characters, the first information indicating whether the first character requires a diacritical mark. The technique includes when the first character requires a diacritical mark, determining, at the user device, second information corresponding to the first character based on the context of the one or more second characters, the second information indicating a specific diacritical mark. The technique includes generating, at the user device, a modified first character based on the first character and the first and second information. The technique includes displaying, via the display of the user device, the modified first character.

A system comprising an input determination module, a context determination module, an information determination module, a mark insertion module, and an input control module is presented. The input determination module determines a first character input by a user to a user device including a user interface, a display, and a processor, and determines one or more second characters previously input by the user to the user device. The context determination module determines a context of the one or more second characters using a language model. The information determination module determines first information corresponding to the first character based on the context, the first information indicating whether the first character requires a diacritical mark, and determines second information corresponding to the first character based on the context, the second information indicating a specific diacritical mark. The mark insertion module generates a modified first character based on the first character and the first and second information, wherein the modified first character comprises a character of a Vietnamese alphabet. The input control module provides the modified first character to the user via the display of the user device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
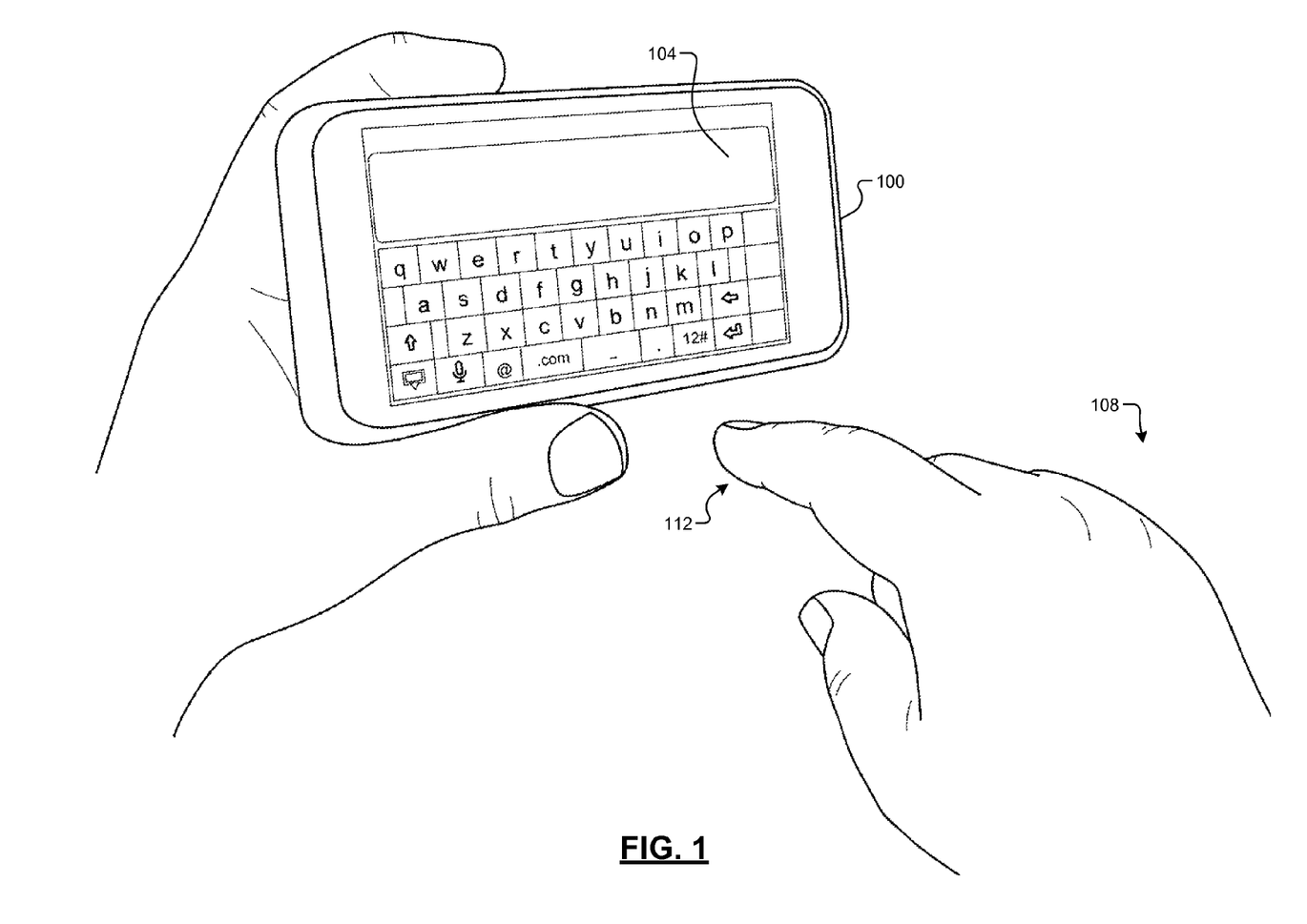
FIG. 1 illustrates an example of a user interacting with a user device according to some implementations of the present disclosure.

Referring now to FIG. 1, an example of a user device 100 is shown. As shown, the user device 100 may be a mobile user device such as a mobile phone, a tablet computer, or the like. The user device 100, however, may also be a non-portable computing device such as a desktop computer or the like. The user device 100 generally includes a display 104. For example, the display 104 may be a touch display as shown, such as a capacitive sensing display. As previously described, the user device 100 may additionally or alternatively include a physical character layout, e.g., a partial QWERTY-based keyboard. For purposes of simplicity, however, a touch display and user touch input are the display and user input technique referred to herein, respectively. The touch display 104 may display information to a user 108 and receive input from the user 108. For example, the user 108 may input information to the user device 100 via the touch display 104 using one or more fingers 112.

User devices, such as the user device 100 of FIG. 1, are widely available and thus may be used in many different countries throughout the world. Therefore, user devices may be configured to display information to and/or receive information from a user in a variety of different languages. Input method editors, or IMEs, are software applications that allow a user to input different languages to a user device. Many languages have writing systems that are based on the Latin alphabet, e.g., English, Spanish, and French. There are many other languages, however, that have writing systems based on the Latin alphabet, but that further include additional accent or tone marks, also known as "diacritical marks."

Vietnamese is one language that as a writing system (called "quốc ngữ") that is based on the Latin (English) alphabet, but further includes five different diacritical marks for a total of six different tones (one tone has no diacritical mark). For example only, the six tones and five diacritical marks and their corresponding descriptions are shown in the table below:

| Name | Description | Diacritical Mark | Example |
|------|-------------|------------------|---------|
| ngang | level | no mark | ma (ghost) |
| huyền | hanging | grave accent | mà (but) |
| sắc | sharp | acute accent | má (cheek) |
| hỏi | asking | hook | mả (tomb) |
| ngã | tumbling | tilde | mã (horse) |
| nặng | heavy | dot (below) | mạ (rice) |

Vietnamese further includes 12 additional vowels (ă, â, ê, ô, o', u', Ă, Â, Ê, Ô, O', and U') and two additional consonants (đ, Đ) in comparison to the standard English alphabet. The combination of the additional vowels, additional consonants, and five different diacritical marks results in over 100 additional Vietnamese characters in comparison to the standard English alphabet.

Typical IMEs for user devices allow a user to input Vietnamese characters having diacritical marks by inputting an English character (one "click") followed by one or more additional clicks to select an appropriate diacritical mark. The additional input required by the user to select the appropriate diacritical mark increases the user's time spent inputting text. Many users, therefore, input the English characters representing Vietnamese text without inserting the appropriate diacritical marks. Experienced Vietnamese speakers may be able to determine the appropriate meaning/tone without the diacritical marks, but many less experienced users may be unable to do so.

Accordingly, techniques are presented for inserting diacritical marks to text input via a user device. These techniques generally provide for faster insertion of diacritical marks to characters input via a user device. While Vietnamese is specifically referred to and discussed herein, these techniques may be applied to any other languages having diacritical marks. Additionally, while mobile user devices are shown, the techniques may be applied to any suitable user computing devices. The techniques include receiving a first character input by a user to a user device and then determining one or more second characters previously input by the user to the user device, the one or more second characters already having diacritical marks inserted, e.g., via the techniques described herein. It should be appreciated that the first character, and the one or more second characters, may include one or more words.

The techniques may then determine a context of the one or more second characters using a language model. The one or more second characters may include a number of words, e.g., two words or three words, or a string of characters. Depending on the one or more second characters, this determination may occur either locally (at the user device) or in the cloud (at a server connected to the user device via a network). For example, the one or more second characters may include two words or three words. Other numbers of characters and/or words, however, may also be used. When two words are used, the context may be determined locally. When three words are used, however, the context may be determined at the server due to limited storage capabilities at the user device.

The techniques may then determine first and second information corresponding to the first character, the first and second information based on the context of the one or more second characters. The first information indicates whether the first character requires a diacritical mark, whereas the second information indicates a specific diacritical mark. Determining the first and second information may further include generating a score for each possible diacritical mark for the first character based on the context. The first and second information may then be determined based on the scores and one or more thresholds.

For example, the techniques may determine the first information based on whether any of the scores corresponding to the diacritical marks are greater than a predetermined threshold. If no score is greater than the predetermined threshold, however, then no diacritical mark may be required. If more than one of the scores corresponding to the diacritical marks is greater than the predetermined threshold, then the diacritical mark having the higher score may be selected as the specific diacritical mark.

The techniques may then generate a modified first character based on the first character and the first and second information. For example, generating the modified first character may include inserting the specific diacritical mark to the first character according to the first and second information. The techniques may then display the modified first character to the user, transmit the modified first character to another user or via the Internet, and/or send the modified first character to a processor. In some implementations, the techniques may suggest a completed word based on the modified first character and/or the context.

Additionally, in some implementations, the techniques may include receiving a string of characters only, i.e., not one or more words. The string of characters may represent a string of first letters of a plurality of words. For example, the user may input the string of characters "Isptmt" as a shorthand for the phrase "lịch sử' phát thên máy tính." The techniques may divide the string of characters and determine a plurality of potential Vietnamese phrases (including diacritical marks) using a language model. For example, Vietnamese phrases including words having first letters that correspond to the string of characters may be scored using the language model and the phrases and their corresponding scores, e.g., probabilities, may be presented to the user for a selection. Alternatively, for example, the Vietnamese phrase having the highest score may be automatically selected for the user.

Furthermore, in some embodiments, the techniques can include utilizing a language model to detect and correct a misspelled word input by a user ("autocorrect"). The techniques can also include utilizing a language model to determine one or more word candidates based on a partial word input by the user. These word candidates can be displayed on the display 104 such that the user 108 can select the word candidate that matches the word that the user 108 was in the process of inputting to "autocomplete" that word. Finally, the techniques may further include a word prediction functionality. This word predication functionality can utilize a language model to determine one or more word candidates based on the previously input one or more words. These word candidates can be displayed on the display 104 such that the user 108 can select the word candidate that matches the word that the user 108 wishes to include to complete the phrase or sentence. It should be appreciated that the autocorrect, autocomplete and word prediction functionality can be utilized separately or together in any combination.

Figure 2:
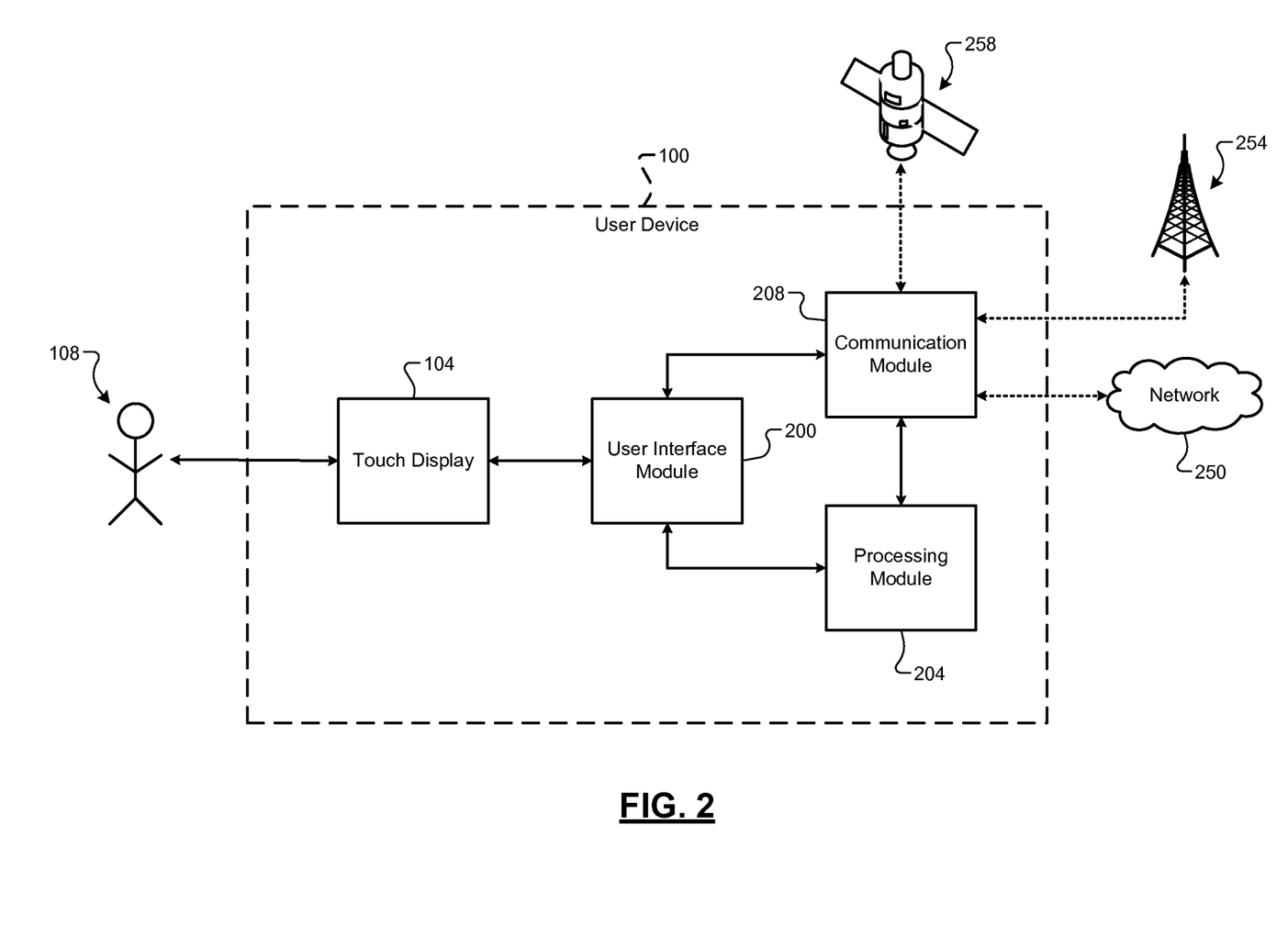
FIG. 2 is a functional block diagram of the user device of FIG. 1 according to some implementations of the present disclosure.

Referring now to FIG. 2, an example of the user device 100 is shown in more detail. As previously described, the user device 100 includes the touch display 104. For example, the touch display 104 may be a capacitive sensing display. The touch display 104 displays information to the user 108 and receives information input by the user 108. As previously described, the user device 100 may additionally or alternatively include a physical character layout, e.g., a partial QWERTY-based keyboard, for receiving input from the user 108. The user device 100 may further include a user interface module 200, a processing module 204, and a communication module 208. While these three modules are shown and described herein, the user device 100 may include additional computing components such as memory and the like.

The user interface module 200 controls communication with the user 108 via the touch display 104 of the user device 100. The user interface module 200 may provide the user 108 with various different character input configurations via the touch display 104 of the user device 100. For example, the user interface module 200 may provide the user 108 with a form of the standard QWERTY keyboard via the touch display 104 of the user device 100. Alternatively, for example, the user interface module 200 may provide the user 108 with a standard 12-key configuration, also known as a T9-input based character configuration.

The user interface module 200 may also receive input from the user 108, e.g., via the provided character input configuration. The user interface module 200, however, may also include various IMEs, e.g., an English to Vietnamese IME, that allow the user 108 to input characters in different languages. The user interface module 200, therefore, may also convert the input received from the user 108 to a desired language, e.g., Vietnamese, by inserting any necessary diacritical marks. For example, the user interface module 200 may use a language model in conjunction with a language datastore and/or a set of lexicon or language rules when inserting the diacritical marks (described in detail later).

The processing module 204 controls most operations of the user device 100. The processing module 204, therefore, may communicate with both the user interface module 200 and the communication module 208. For example, the processing module 204 may perform tasks such as, but not limited to, loading/controlling the operating system of the user device 100, loading/configuring communication parameters for the communication module 208, controlling IME parameters of the user interface module 200, and controlling memory storage/retrieval operations, e.g., for loading of the various parameters.

The communication module 208 controls communication between the user device 100 and other devices. For example only, the communication module 208 may provide for communication between the user device 100 and other users associated with the user 108 and/or the Internet. The user device 100 may typically communicate via one or more of three communication mediums: a computing network 250, e.g., the Internet (hereinafter "the network 250"), a mobile telephone network 254, and a satellite network 258. Other communication mediums may also be implemented. For example, the communication module 208 may be configured for both wired and wireless network connections, e.g., radio frequency (RF) communication.

Figure 3A:
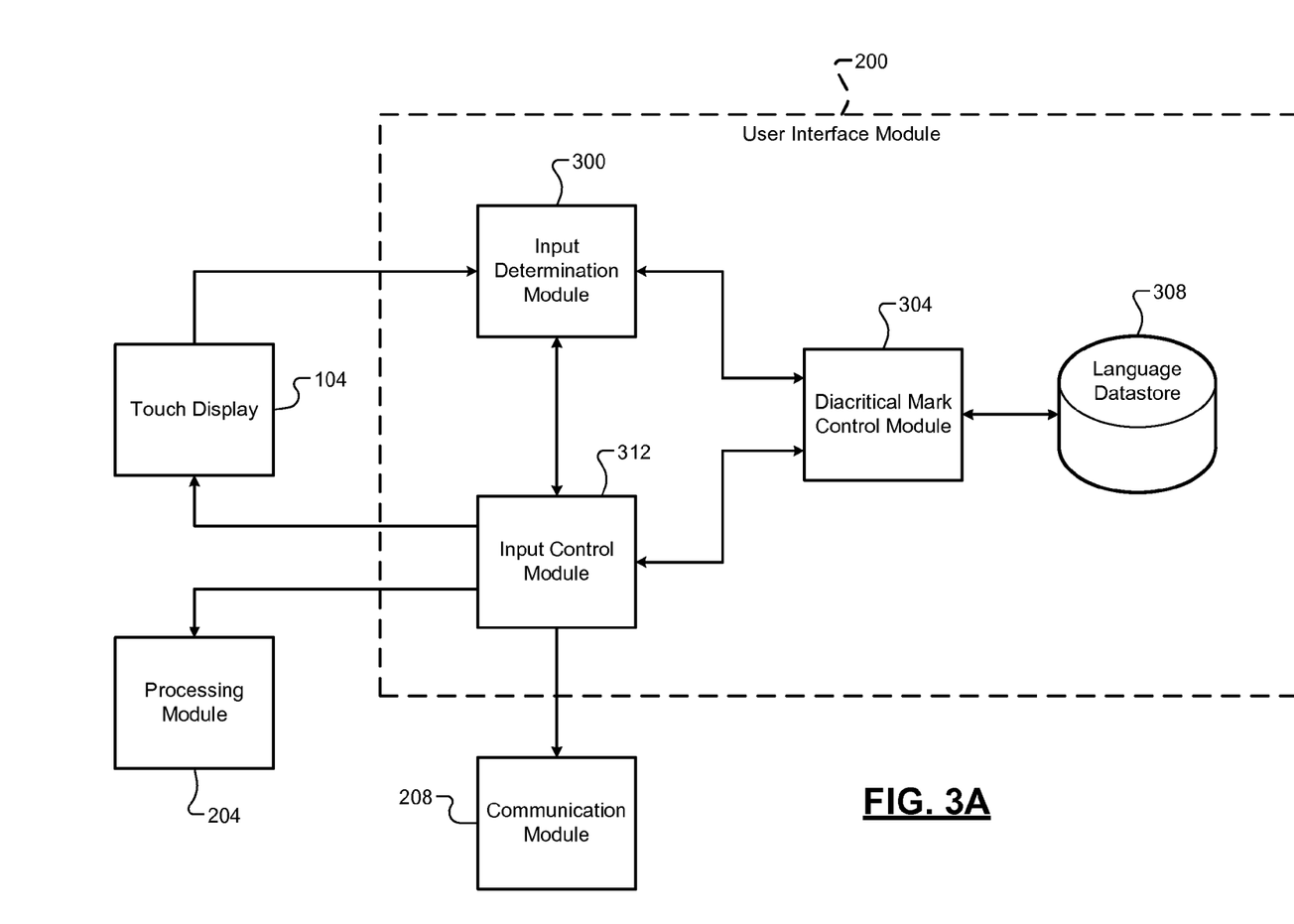
FIG. 3A is a functional block diagram of an example of a user interface module of the user device of FIG. 1 according to some implementations of the present disclosure.

Referring now to FIG. 3A, an example of the user interface module 200 is shown. The user interface module 200 may include an input determination module 300, a diacritical mark control module 304, a language datastore 308, and an input control module 312. While these three modules and a single datastore are shown and described herein, the user interface module 200 may include additional computing components such as other memory and the like.

The input determination module 300 determines characters input by the user 108 to the user device 100. Specifically, the input determination module 300 may determine a first character, e.g., a Vietnamese character, input by the user 108. The input determination module 300, however, may also store one or more second characters, the one or more second characters previously input by the user 108. It should be appreciated that each of the first character and the one or more second characters may include one, two or three words, e.g., Vietnamese words. Other quantities of characters and words, however, may also be used. For example, the input determination module 300 may store the one or more second characters in random access memory (RAM). Alternatively, the input control module 312 may store the previously input words, e.g., having diacritical marks inserted via the techniques described herein.

The diacritical mark control module 304 receives the first character and the one or more second characters from the input determination module 300. In the configuration shown in FIG. 3A, the diacritical mark control module 304 may use the language datastore 308 in determining whether the first character requires a diacritical mark, and if so, which diacritical mark. Specifically, the diacritical mark control module 304 may first determine a context of the one or more second characters using a language model. The one or more second characters may include two words due to storage limitations of the user device 100. The diacritical mark control module

304 may then determine first and second information for the first character based on the context, the first information indicating whether the first character requires a diacritical mark and the second information indicating a specific diacritical mark.

As previously described, the language datastore 308 stores data corresponding to various different languages such as, for example only, English, Vietnamese, Chinese, Spanish, French, Japanese, and Korean. The stored data may include lexicons for the various languages, rules for the various languages, rules for translating between the various languages, and the like. More specifically, the language datastore 308 may be used by the language model for determining whether the first character requires a diacritical mark and, if so, which diacritical mark. For example, the language datastore 308 may be memory, e.g., non-volatile memory, located within the user device 100. The diacritical mark control module 304 may generate a modified character based on the first character and the first and second information.

The input control module 312 may receive the modified first character, e.g., having the specific diacritical mark, from the diacritical mark control module 304. The input control module 312 may output the modified first character to the touch display 104, to the processing module 204, and/or to the communication module 208. For example, the input control module 312 may replace the original first character with the modified first character on the touch display 104. Additionally or alternatively, the input control module 312 may transmit the modified first character (and possibly the one or more second characters) to another user or device via the communication module 208, e.g., via one of the communication mediums described herein. In some instances, however, the first character may not require a diacritical mark and therefore the input control module 312 may receive the first character.

Figure 3B:
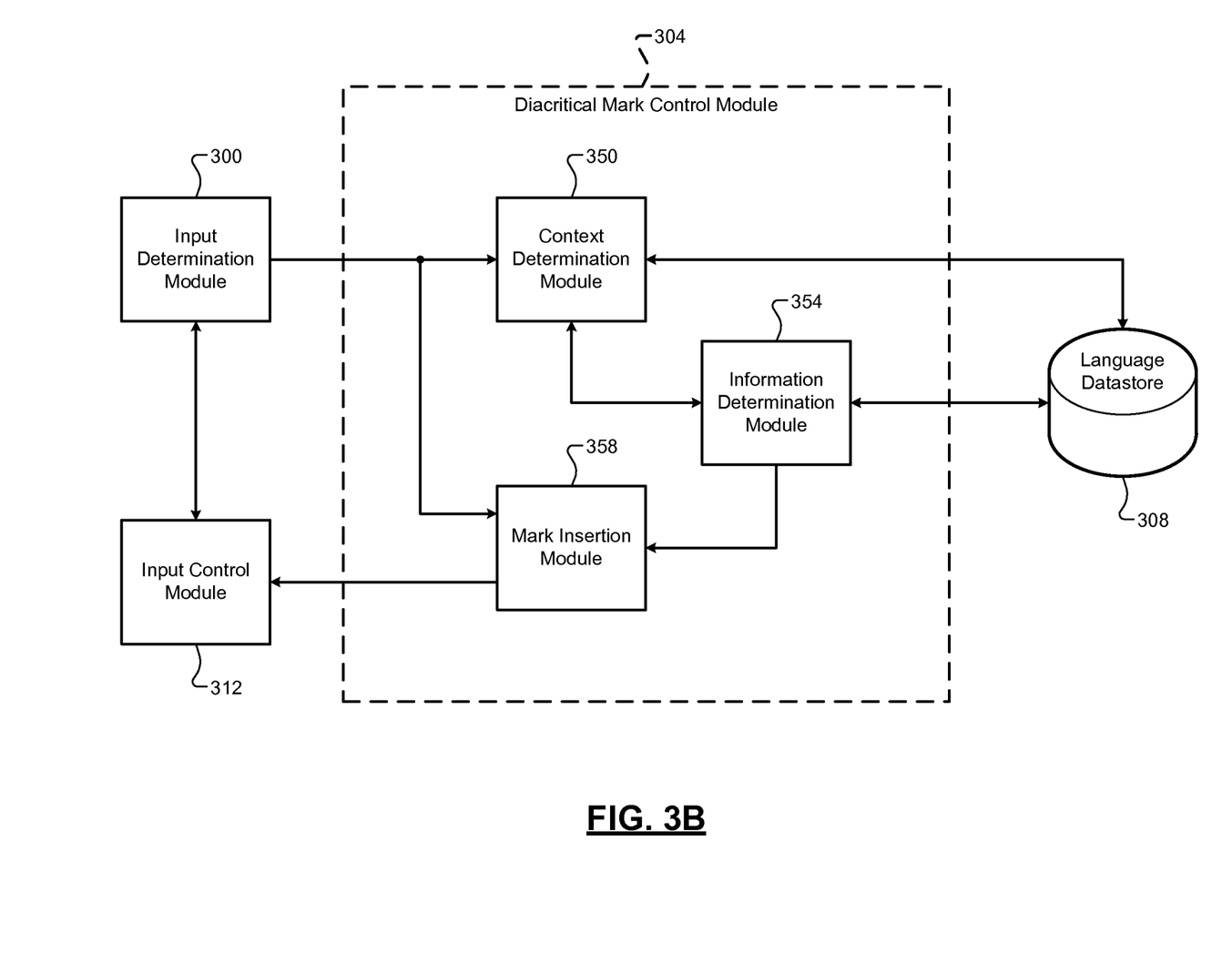
FIG. 3B is a functional block diagram of an example of a diacritical mark control module of the user interface module of FIG. 3A according to some implementations of the present disclosure.

Referring now to FIG. 3B, another example of the diacritical mark control module 304 of FIG. 3A is shown. The diacritical mark control module 304 may include a context determination module 350, an information determination module 354, and a mark insertion module 358. While three modules are shown and discussed herein, the diacritical mark control module 304 may include other suitable computing components such as memory and the like.

The context determination module 350 may determine the context of the one or more second characters, e.g., the two previous words, using a language model. Specifically, determining the context using the language model includes using the language datastore 308. The context of a word may include, for example only, parts of written language that precede a specific word, usually influencing its meaning or effect, or a set of circumstances or facts that surround a particular event or situation. For example, the context determination module 350 may first determine the context of the two previous words using information stored in the language datastore 308 such as usage patterns, lexical rules, and the like. In some implementations, the context determination module 350 may then generate a score for each possible diacritical mark for the first character based on the context, each score indicating a likelihood that the first character requires that particular diacritical mark based on the context.

The information determination module 354 may then determine the first and second information for the first character based on the context. More specifically, the information determination module 354 may determine the first and second information based on the scores and a predetermined threshold. When one or more diacritical marks have a corresponding score greater than the predetermined threshold, the information determination module 354 may determine that the first character requires a diacritical mark (the first information). For example, the predetermined threshold may be determined by a machine learning technique such that a score above the predetermined threshold provides a high degree of certainty that a diacritical mark is required. For example only, the diacritical mark having the highest score may be selected (the second information). When no diacritical mark has a score greater than the predetermined threshold, however, the information determination module 354 may determine that the first character does not require a diacritical mark (the first information). In this case, no second information (or null second information) may be determined.

The mark insertion module 358 selectively inserts a diacritical mark to the first character based on the first and second information. As previously described, the first information indicates whether the first character requires a diacritical mark and the second information indicates a specific diacritical mark. The mark insertion module 358, therefore, may insert the specific diacritical mark indicated by the second information. More specifically, the mark insertion module 358 may generate a modified first character, the modified first character being the first character with the specific diacritical mark inserted. The mark insertion module 358 may then output the modified first character to the input control module 312.

Figure 4A:
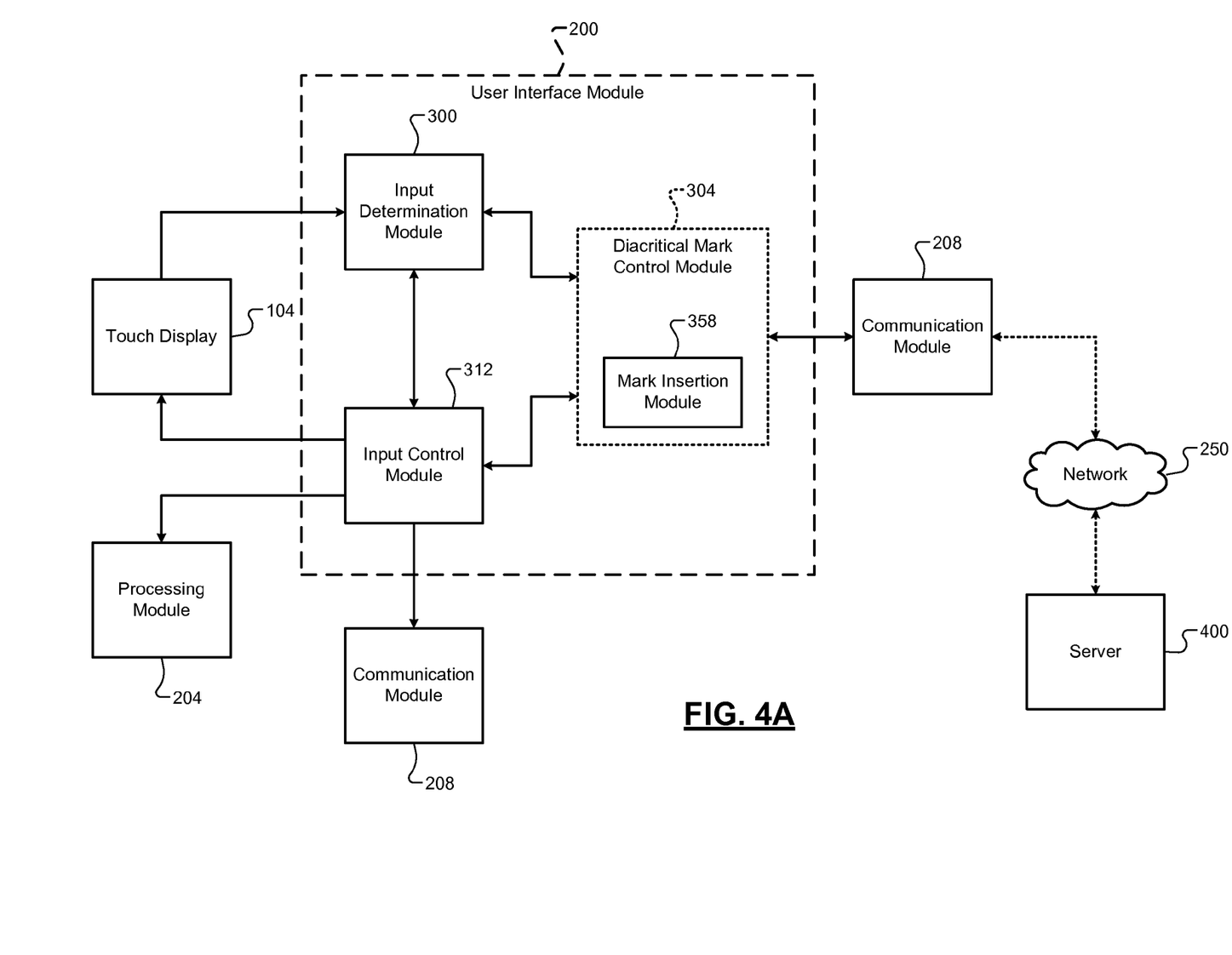
FIG. 4A is a functional block diagram of another example of the user interface module of the user device of FIG. 1 according to some implementations of the present disclosure.

Referring now to FIG. 4A, another example of the user interface module 200 is shown. This configuration of the user interface module 200, similar to the configuration of FIG. 3A, also includes the input determination module 300, the diacritical mark control module 304, and the input control module 312. This configuration, however, does not include the language datastore 308. In this configuration, the user interface module 200 (and the diacritical mark control module 304) is in communication with a server 400 via the network 250. While these three modules are shown and described herein, the user interface module 200 may include additional computing components such as memory and the like.

The input determination module 300 determines characters input by the user 108 to the user device 100. Specifically, the input determination module 300 may determine a first character, such as a Vietnamese character, input by the user 108. The input determination module 300, however, may also store one or more second characters, the one or more second characters having been previously input by the user 108. For example, the input determination module 300 may store the one or more second characters in random access memory (RAM). The one or more second characters may include two or three words, such as Vietnamese words, however other quantities of characters and words may also be used. The one or more second characters may also have had diacritical marks already inserted, e.g., via the techniques described herein.

The diacritical mark control module 304 receives the first character and the one or more second characters from the input determination module 300. In the configuration shown in FIG. 4A, the diacritical mark control module 304 may transmit the first character and the one or more second characters to the server 400 for determination as to whether the first character requires a diacritical mark, and if so, which diacritical mark. The server 400 may then determine a context of the one or more second characters using a language model in addition to the first and second information. In this case, however, the one or more second characters may include three words due to increased storage capacity of the server 400 in comparison to user device 100. The diacritical mark control module 304 may then receive the first and second information from the server 400.

The mark insertion module 358 selectively inserts a diacritical mark to the first character based on the first and second information. As previously described, the first information indicates whether the first character requires a diacritical mark and the second information indicates a specific diacritical mark. The mark insertion module 358, therefore, may insert the specific diacritical mark indicated by the second information. More specifically, the mark insertion module 358 may generate a modified first character, the modified first character being the first character with the specific diacritical mark inserted. The mark insertion module 358 may then output the modified first character to the input control module 312.

The input control module 312 may receive the modified first character, e.g., having the specific diacritical mark, from the diacritical mark control module 304. The input control module 312 may output the modified first character to the touch display 104, to the processing module 204, and/or to the communication module 208. For example, the input control module 312 may replace the original first character with the modified first character on the touch display 104. Additionally or alternatively, the input control module 312 may transmit the modified first character (and possibly the one or more second characters) to another user or device via the communication module 208, e.g., via one of the communication mediums described herein. In some instances, however, the first character may not require a diacritical mark and therefore the input control module 312 may receive the first character.

Figure 4B:
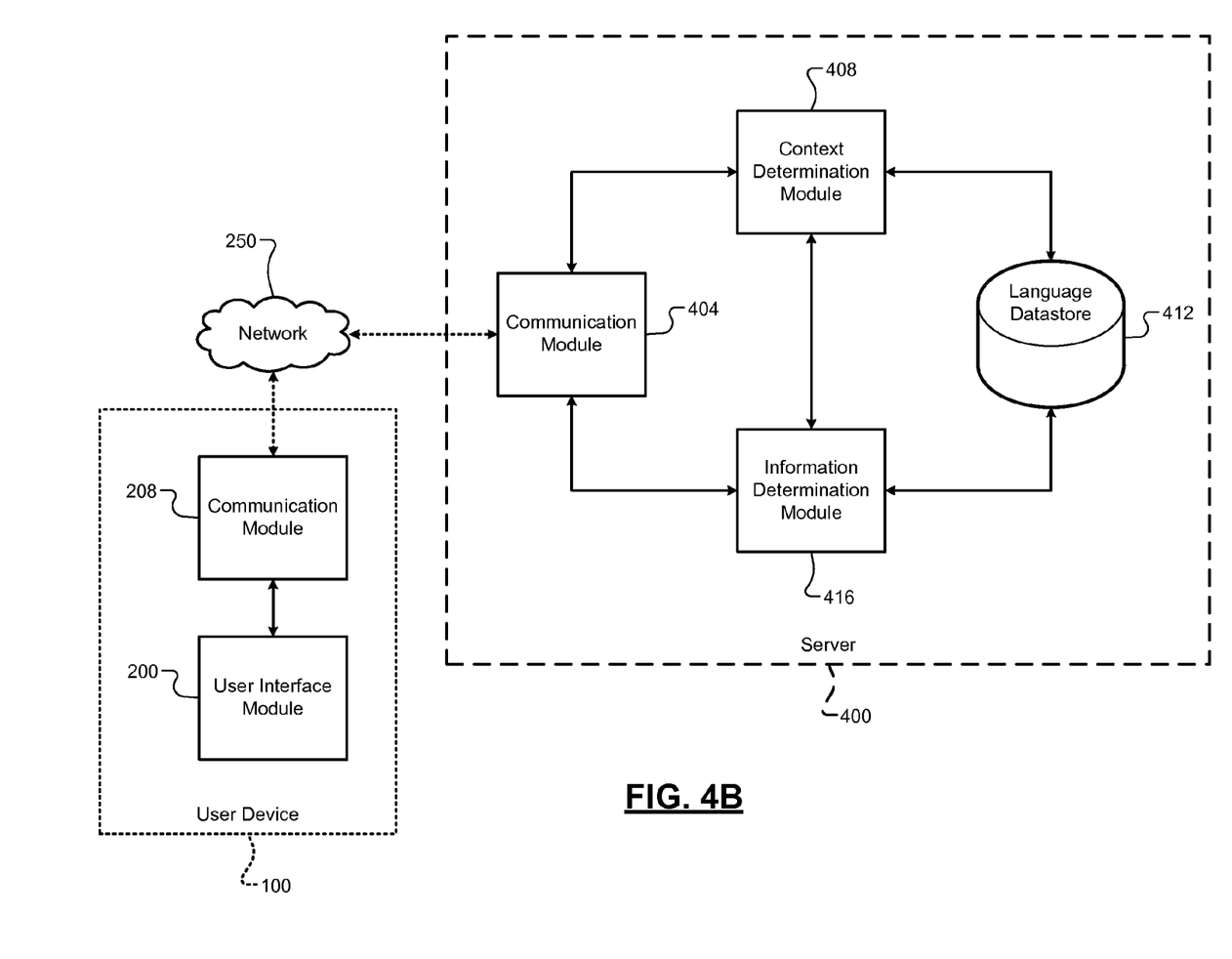
FIG. 4B is a functional block diagram of an example of a server of FIG. 4A according to some implementations of the present disclosure.

Referring now to FIG. 4B, an example of the server 400 is shown. The server 400 may include a communication module 404, a context determination module 408, a language datastore 412, and an information determination module 416. The communication module 404 receives the first character and the one or more second characters transmitted by the user device 100 and transmits the first and second information back to the user device 100. In this configuration, however, the server 400 may determine the context of the one or more second characters in addition to the first and second information for the first character. The one or more second characters, therefore, may include three or more previous words. Additionally, while the context determination module 408, the language datastore 412, and the information determination module 416 have similar structure and behave similarly to the components of FIG. 3B, these components are configured for three previous words.

The context determination module 408 may determine the context of the one or more second characters, e.g., the three previous words, using a language model. Specifically, determining the context using the language model includes using the language datastore 412. For example, the context determination module 408 may first determine the context of the three previous words using information stored in the language datastore 412 such as usage patterns, lexical rules, and the like. In some implementations, the context determination module 408 may then generate a score for each possible diacritical mark for the first character based on the context, each score indicating a likelihood that the first character requires that particular diacritical mark based on the context.

As previously described, the language datastore 412 stores data corresponding to various different languages such as, for example only, English, Vietnamese, Chinese, Spanish, French, Japanese, and Korean. The stored data may include lexicons for the various languages, rules for the various languages, rules for translating between the various languages, and the like. More specifically, the language datastore 412 may be used by the language model for determining whether the first character requires a diacritical mark and, if so, which diacritical mark. The language model stored in the language datastore 412 may also be trainable based on information accessible via the network 250, e.g., the Internet. For example, the language datastore 412 may be memory, e.g., non-volatile memory, located within the user device 100.

The information determination module 416 may then determine the first and second information for the first character based on the context. More specifically, the information determination module 416 may determine the first and second information based on the scores and one or more thresholds. For example, when one or more diacritical marks have a corresponding score greater than a predetermined threshold, the information determination module 416 may determine that the first character requires a diacritical mark (the first information). For example, the diacritical mark having the highest score may be selected (the second information). When no diacritical mark has a score greater than the predetermined threshold, however, the information determination module 416 may determine that the first character does not require a diacritical mark (the first information). In this case, no second information (or null second information) may be determined.

Figure 5:
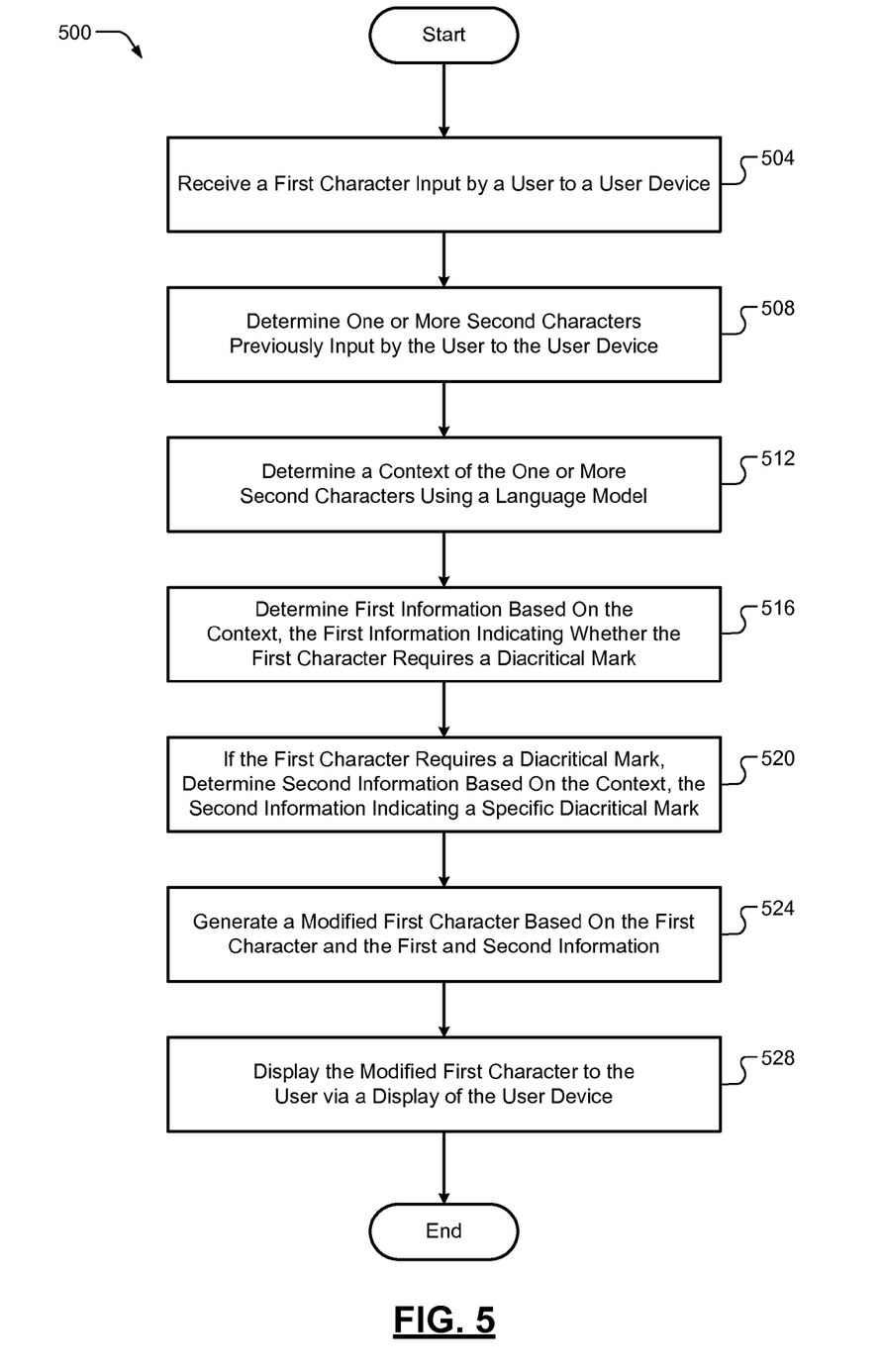
FIG. 5 is a flow diagram of an example of a technique for inserting diacritical marks to text input via a user device according to some implementations of the present disclosure.

Referring now to FIG. 5, an example of a technique 500 for inserting diacritical marks to text input via a user device begins at 504. At 504, the input determination module 300 receives a first character input by the user 108 to the user device 100. At 508, the input determination module 300 determines one or more second characters previously input by the user 108 to the user device 100. At 512, the diacritical mark control module 304 determines a context of the one or more second characters using a language model. At 516, the diacritical mark control module 304 determines first information based on the context of the one or more second characters, the first information indicating whether the first character requires a diacritical mark.

At 520, if the first character requires a diacritical mark, the diacritical mark control module 304 determines second information based on the context of the one or more second characters, the second information indicating a specific diacritical mark. At 524, the diacritical mark control module 304 generates a modified first character based on the first character and the first and second information, the modified first character comprising a character of the Vietnamese alphabet. At 528, the input control module 312 displays the modified character to the user 108 via the touch display 104 of the user device 100. The technique 500 may then end or repeat for one or more additional cycles.

Figure 6:
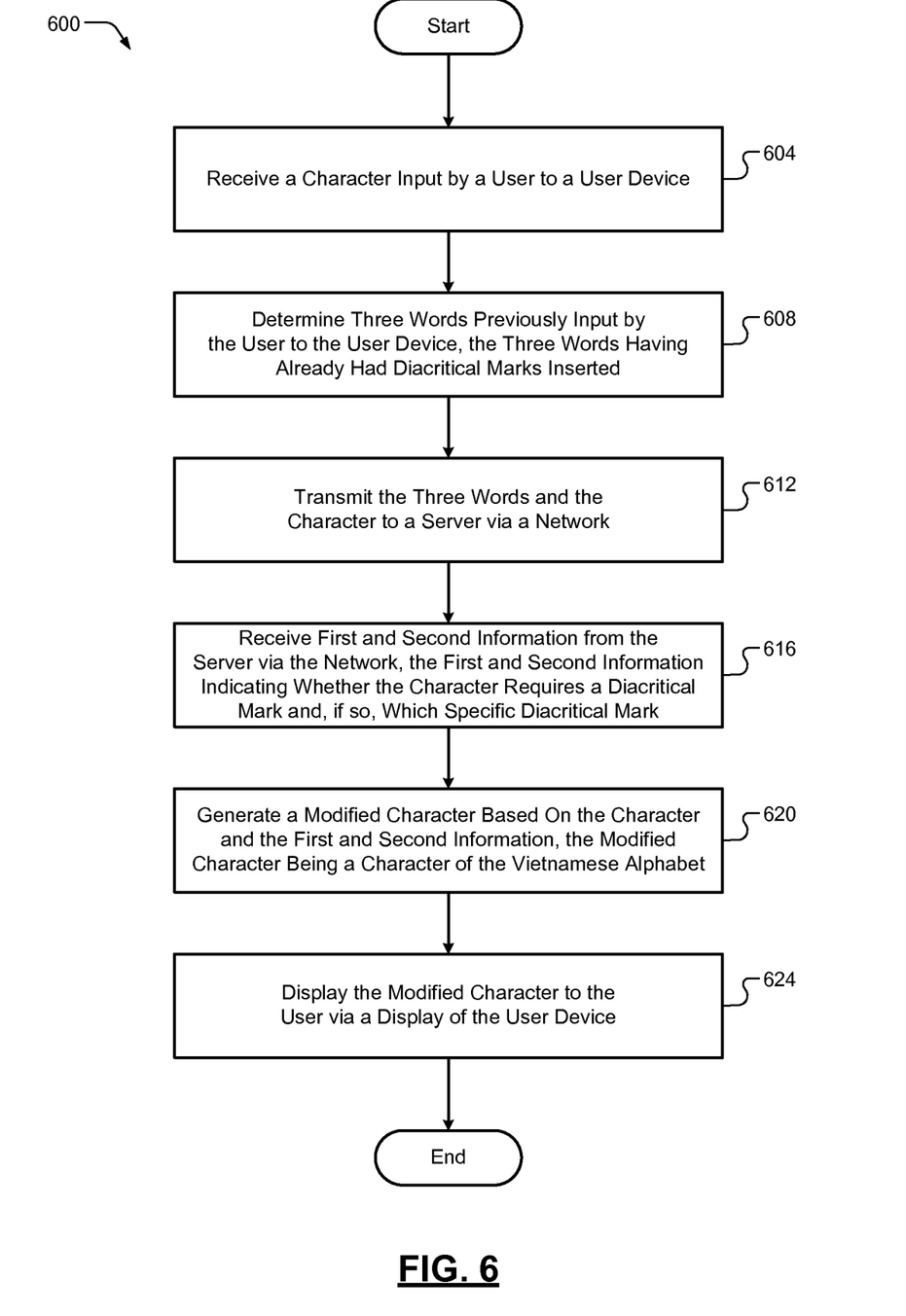
FIG. 6 is a flow diagram of an example of a technique for assisting a user to input Vietnamese text via a user interface of a user device lacking a subset of characters in a Vietnamese alphabet according to some implementations of the present disclosure.

Referring now to FIG. 6, an example of a technique 600 for assisting a user to input Vietnamese text via a user interface of a user device lacking a subset of characters in a Vietnamese alphabet begins at 604. At 604, the input determination module 300 receives a character input by the user 108 to the user device 100. At 608, the input determination module 300 determines three words previously input by the user 108 to the user device 100, the three words having already had diacritical marks inserted.

At 612, the communication module 208 transmits the three words and the character to the server 400 via the network 250. At 616, the communication module 208 receives first and second information corresponding to the character from the server 400 via the network 250, the first and second information generated at the server 400 using a language model that determines a context based on the three words, the first information indicating whether the character requires a diacritical mark, and, if so, the second information indicating a specific diacritical mark.

At 620, the diacritical mark control module 304 generates a modified character based on the character and the first and second information, the modified character comprising a character from the Vietnamese alphabet. At 624, the input control module 312 displays the modified character to the user 108 via the touch display 104 of the user device 100. The technique 600 may then end or repeat for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for assisting a user to input Vietnamese text via a user interface of a user device lacking a subset of characters in a Vietnamese alphabet, the method comprising:
   receiving, at the user device including the user interface, a display, and a processor, a character input by a user;
   determining, at the user device, three words previously input by the user, the three words having already had diacritical marks inserted;
   transmitting, from the user device, the three words and the character to a server via a network;
   receiving, at the user device, at least one of first and second information corresponding to the character from the server via the network, the first and second information generated at the server based on a context of the three words, the context determined at the server using a language model, the first information indicating whether the character requires a diacritical mark, and the second information indicating a specific diacritical mark;
   generating, at the user device, a modified character based on the character and the first and second information, the modified character comprising a character in the Vietnamese alphabet; and
   displaying, via the display of the user device, the modified character.

2. A computer-implemented method, comprising:
   receiving, at a user device including a user interface, a display, and a processor, a first character input by a user;
   determining, at the user device, one or more second characters previously input by the user to the user device;
   determining, at the user device, a context of the one or more second characters using a language model;
   determining, at the user device, first information corresponding to the first character based on the context of the one or more second characters, the first information indicating whether the first character requires a diacritical mark;
   when the first character requires a diacritical mark, determining, at the user device, second information corresponding to the first character based on the context of the one or more second characters, the second information indicating a specific diacritical mark;
   generating, at the user device, a modified first character based on the first character and the first and second information; and
   displaying, via the display of the user device, the modified first character.

3. The computer-implemented method of claim 2, wherein the language model is stored in the user device.

4. The computer-implemented method of claim 3, wherein the one or more second characters previously input by the user to the user device include two words.

5. The computer-implemented method of claim 2, further comprising transmitting, from the user device, the first character and the one or more second characters to a server via a network.

6. The computer-implemented method of claim 5, wherein the one or more second characters previously input by the user to the user device include three words.

7. The computer-implemented method of claim 6, wherein determining the context of the one or more second characters further comprises generating a score for each possible diacritical mark for the first character at the server based on the context, wherein each score indicates a likelihood that the first character requires one of the possible diacritical marks.

8. The computer-implemented method of claim 7, wherein determining the first and second information corresponding to the first character further comprises receiving, at the user device, the first and second information from the server, the first and second information being generated based on the scores and a predetermined threshold.

9. The computer-implemented method of claim 8, wherein the first information indicates that the first character requires a diacritical mark when one or more of the possible diacritical marks has a corresponding score greater than the predetermined threshold.

10. The computer-implemented method of claim 9, wherein when more than one of the possible diacritical marks has a corresponding score greater than the predetermined threshold, the second information indicates the diacritical mark having a highest corresponding score.

11. The computer-implemented method of claim 10, wherein generating the modified first character includes inserting the specific diacritical mark to the first character according to the first and second information.

12. A system, comprising:
   an input determination module that determines a first character input by a user to a user device including a user interface, a display, and a processor, and that determines one or more second characters previously input by the user to the user device;
   a context determination module that determines a context of the one or more second characters using a language model;
   an information determination module that determines first information corresponding to the first character based on the context, the first information indicating whether the first character requires a diacritical mark, and that determines second information corresponding to the first character based on the context, the second information indicating a specific diacritical mark;
   a mark insertion module that generates a modified first character based on the first character and the first and second information, wherein the modified first character comprises a character of a Vietnamese alphabet; and
   an input control module that provides the modified first character to the user via the display of the user device.

13. The system of claim 12, wherein the language model is stored in the user device.

14. The system of claim 13, wherein the one or more second characters previously input by the user to the user device include two words.

15. The system of claim 12, further comprising a communication module that transmits the first character and the one or more second characters from the user device to a server via a network, and that receives the first and second information corresponding to the first character from the server via the network.

16. The system of claim 15, wherein the one or more second characters previously input by the user to the user device include three words.

17. The system of claim 16, wherein the server generates a score for each possible diacritical mark for the first character based on the context, wherein each score indicates a likelihood that the first character requires one of the possible diacritical marks.

18. The system of claim 17, wherein the server generates the first and second information based on the scores and a predetermined threshold, wherein the first information indicates that the first character requires a diacritical mark when one or more of the possible diacritical marks has a corresponding score greater than the predetermined threshold.

19. The system of claim 18, wherein when more than one of the possible diacritical marks has a corresponding score greater than the predetermined threshold, the second information indicates the diacritical mark having a highest corresponding score.

20. The system of claim 19, the mark insertion module generates the modified first character by inserting the specific diacritical mark to the first character according to the first and second information.

* * * * *